Dec. 19, 1967   A. N. ORMOND   3,358,501
LINEARIZATION OF OUTPUT SIGNALS FROM
LOAD CELL BRIDGE CIRCUITS
Filed May 5, 1965
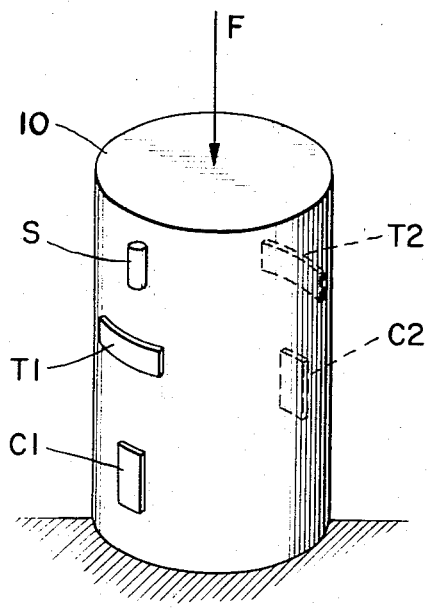
FIG.1.
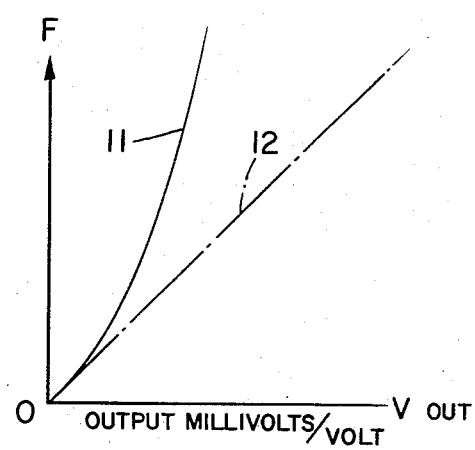
FIG.2.
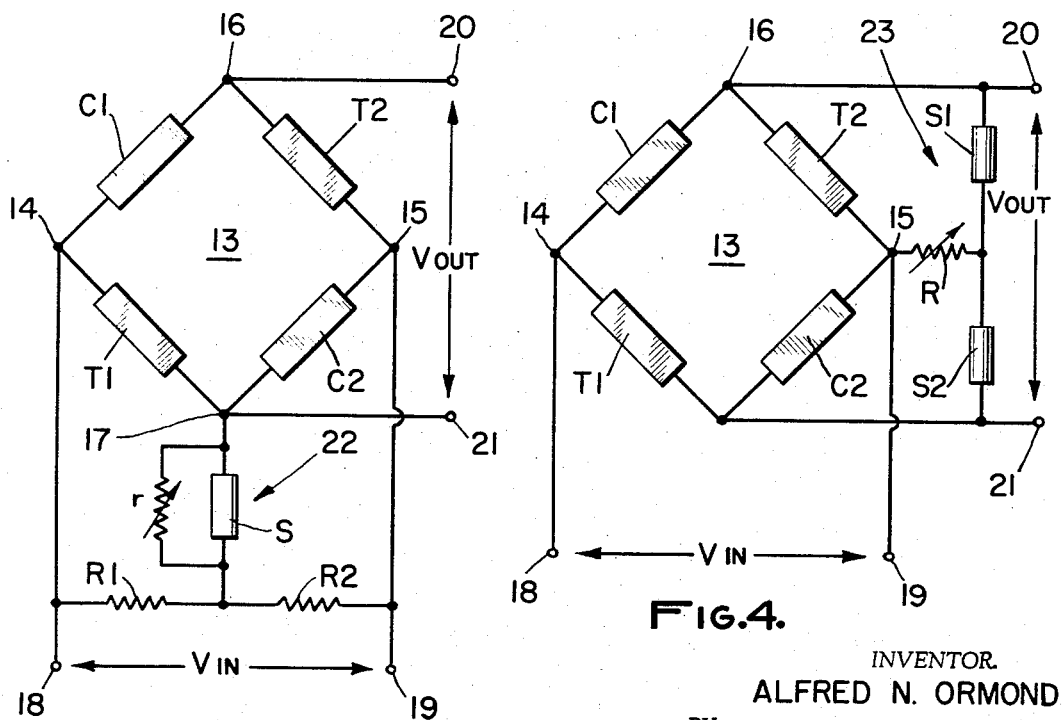
FIG.3.
FIG.4.
INVENTOR.
ALFRED N. ORMOND
BY
Elliott & Pastoriza
ATTORNEYS United States Patent Office 3,358,501
Patented Dec. 19, 1967

3,358,501
LINEARIZATION OF OUTPUT SIGNALS FROM
LOAD CELL BRIDGE CIRCUITS
Alfred N. Ormond, 11969 Rivera Road,
Santa Fe Springs, Calif. 90670
Filed May 5, 1965, Ser. No. 453,389
6 Claims. (Cl. 73—141)

ABSTRACT OF THE DISCLOSURE

This disclosure relates to a T compensating network for connection across the input or output terminals of a strain gauge bridge for providing a more linear output signal. The T network itself includes, in one embodiment, resistances in the arms of the T and a semi-conductor element in the leg of the T, the free ends of the arms of the T connecting across the input terminals and the leg of the T connecting to the bridge junction point between the input terminals. In a second embodiment, the arms each include a semi-conductor element and the leg of the T includes a resistance, the free ends of the arms connecting across the output terminals of the bridge and the end of the leg connecting the junction point between the output terminals. In each instance, the output signal from the bridge for an incremental increase in the loading of the load cell will decrease at a lesser rate than in the absence of the T network. As a consequence, the non-linear output curve of the bridge will tend to approach a linear characteristic when the T network is provided as compared to the situation in which the T network is not present.

---

Linearization of the input signals of load cells by use of compensating circuits is shown and described in my co-pending patent application Serial No. 334,082, filed December 24, 1963, and entitled, Linearization of Load Cells, now U.S. Patent No. 3,228,240.

This invention relates generally to load cell bridge circuits and more particularly to a novel means for linearizing the output signal from the bridge circuit with respect to the value of force being measured by the load cell.

In carrying out measurements of forces by means of load cells, it is conventional practice to utilize an electrical bridge in which strain gauge means constitute at least two arms of the bridge, the other two arms being dummy resistances or strain gauges. The strain gauges themselves are secured to a load cell which in turn is subject to deformation by thef orce to be measured. Preferably two of the strain gauges are mounted on the cell in a manner to be subject to compression forces and the two remaining strain gauges mounted to be subject to tension forces. By this arrangement, a given force directed along the load axis of the cell will result in an increase in the resistance of two of the strain gauges and a simultaneous decrease in the resistance of the other two gauges. By then properly connecting the gauges in the arms of the bridge network, an output signal will be provided which varies with the loading on the cell.

The value of the output signal may be calibrated for various known loads applied to the cell to provide a proper scale. However, the output signal is usually not linear with respect to a change in the loading force. This non-linearity is a consequence of extraneous strains in the load cell affecting the strain gauges and the fact that a change in resistance in the strain gauge itself is not always linear with respect to the applied force. Moreover, the bridge circuit does not provide an absolutely linear output signal with a linear change in resistance although this latter non-linearity is usually of a second order and may be neglected.

In my above-referred to co-pending United States patent application Serial No. 334,082, filed December 24, 1963, and entitled Linearization of Load Cells, now United States Patent No. 3,228,240, there is shown and described a means for improving the linearity of the output signal. This means is directed primarily towards correcting non-linearities resulting from extraneous strains developed in the load cell because of an effective change in its cross-sectional area in response to the applied force. The compensating systems described in my referred to application may also be adjusted to correct for non-linearity resulting from electrical characteristics of the strain gauges themselves; for example, the inability of a strain gauge to vary its resistance with deformation in a manner which is linear.

The present invention has as its primary object to provide an alternative circuit means for linearizing the output signal with respect to a force applied to a load cell wherein the output signal is derived from an electrical bridge network incorporating strain gauges secured to the load cell, all to the end that a more accurate force measuring system is provided.

Briefly, this and other objects and advantages of this invention are attained by introducing a T network to the electrical bridge circuit for the load cell. In a first embodiment, the arms of the T include resistances and are connected across diagonally opposite junction points of the bridge. The leg of the T includes a semiconductor element secured to the load cell. The end of the leg is connected to a junction point of the bridge between the diagonally opposite junction points to which the arms of the T connect. Essentially, the T network is in shunt with one or more arms of the bridge and so modifies the net resistance in the arms so as to result in a linear output signal. In a second embodiment, the arms of the T include semi-conductors and the leg includes a resistance.

A better understanding of the invention will be had by now referring to preferred embodiments thereof as illustrated in the acocmpanying drawings, in which:

FIGURE 1 is a schematic perspective view of a load cell to which strain gauges are attached and which also includes a semiconductor type strain gauge in accordance with the present invention;

FIGURE 2 shows the output signal from the bridge network plotted against the force applied to the load cell of FIGURE 1;

FIGURE 3 illustrates a first embodiment of the electrical bridge circuit incorporating the strain gauges shown in FIGURE 1 and including the compensating T network of this invention connected across the input terminals of the bridge; and, FIGURE 4 is a view similar to FIGURE 3 illustrating a second embodiment of the T network connected across the output terminals of the bridge.

Referring first to FIGURE 1, there is illustrated a load cell 10 to which a force F to be measured is applied to place the load cell under compression. The load cell could equally as well be placed under tension by a tension type force. However, for purposes of the present specification, the force will be assumed to be a compression force as shown.

Suitable tension type strain gauges T1 and T2 are secured to opposite sides of the cell as shown and compression type strain gauges C1 and C2 similarly secured to the cell but oriented with their strain axes at right angles to those of the tension cells. By this arrangement, the resistance of the tension strain gauges T1 and T2 will increase under the loading of the cell in compression while the resistance of the compression strain gauges C1 and C2 will decrease simultaneously in response to such loading.

In FIGURE 1 there is also shown a semiconductor strain gauge designated S secured to the load cell 10. In the case of a compression force, the resistance of the semiconductor will increase when N type material is used. For a P type semiconductor the resistance will decrease with compression. In the particular embodiments of the invention to be described, the semiconductor S is preferably of the N type when a compression force F is applied to the load cell.

FIGURE 2 illustrates at 11 the electrical signal output from a typical bridge circuit incorporating the strain gauges T1, T2, C1, C2 of FIGURE 1. It will be noted that the output signal is not linear. A desired linearity is illustrated by the dash-dot line 12 in FIGURE 2. In accordance with the present invention, the output signal 11 is modified to coincide substantially with the dash-dot line 12 thereby resulting in a linear relationship between the output signal and applied force to the load cell.

This linearization will be understood by now referring to FIGURE 3 which illustrates a typical bridge circuit 13 having first and second diagonally opposite input junction points 14 and 15 and third and fourth diagonally opposite output junction points 16 and 17. The junction points 14 and 15 connect to input terminals 18 and 19 across which an input electrical signal such as a voltage Vin is applied. The output junction points 16 and 17 in turn connect to output terminals 20 and 21 across which an output signal such as the signal 11 illustrated in FIGURE 2 is taken.

Opposite arms of the bridge include the strain gauges T1 and T2, the resistances of which will both increase with increasing compression force and the other two opposite arms include the strain gauges C1 and C2 the resistance of which will both decrease with increasing compression force. As a consequence of these resistance changes, it will be clear that a voltage signal will be developed across the diagonal output junction points 16 and 17 when a force is applied to the load cell to unbalance the bridge.

The compensating means for linearizing the output signal 11 shown in FIGURE 2 comprises a T network designated generally by the numeral 22. As shown, the arms of this T include first and second resistances R1 and R2 and connect to the diagonally opposite input junction points 14 and 15. The leg of the T in turn includes the semiconductor S and the end of this leg is connected to a junction point between the diagonally opposite junction points 14 and 15 such as the junction point 17. A small trimming resistance r may be provided in shunting relationship with the semiconductor S to effect minor adjustments in the overall resistance characteristic in the leg of the T.

In the T network, the series connection of the semiconductor S and the resistance R2 effectively shunts the arm of the bridge containing the strain gauge C2 and the series connection made up of the same semiconductor S and the resistance R1 effectively shunts the arm of the bridge containing the strain gauge T1. Therefore, the net resistance in the arms of the bridge containing the strain gauges C2 and T1 will increase with increased loading force F since the resistance of the N type semi-conductor S increases with increased loading. The output signal measured between the junction points 16 and 17 for an incremental increase in the loading values in the range of the load cell will decrease at a lesser rate than in the absence of the T network. Accordingly, it will be evident that the non-linear curve of FIGURE 2 will tend to approach the linear dash-dot line 12 more than is the case as would occur in the absence of the T network.

FIGURE 4 illustrates a second embodiment of the T network designated 23 and includes in its arms first and second semiconductors S1 and S2 and in its leg a resistance R. The semiconductors S1 and S2 may again constitute N type material and would be affixed to the load cell 10 of FIGURE 1 in the same orientation as the semiconductor S. In FIGURE 4, the arms of the T network are connected across the output junction points 16 and 17 and the end of the leg of the T network is connected to the junction point 15 between these latter two mentioned diagonally opposite junction points. With these connections, it will be noted that the net resistance across the arms containing the strain gauges T2 and C2 will increase with increased loading force F so that, as in the case of FIGURE 3, the output signal will decrease less rapidly with increasing force to again cause the output signal curve 11 in FIGURE 2 to approach the linear dash-dot line 12.

From the foregoing description, it will thus be evident that the present invention has provided novel compensating circuits for use with bridge networks incorporating load cell strain gauges to the end that a more linear output signal is provided with consequent increase in accuracy in the measuring system.

As mentioned heretofore, while the invention is described herein with respect to a compression force F applied to a load cell, the principles are equally as applicable to a tension force applied to the load cell. Moreover, while each of the resistances in the arms of the bridge have been described as strain gauges fixed to the load cell, two of the resistances may be dummy resistances and the other two active strain gauges. In fact, only one of the arms of the bridge need be active or include a strain gauge, the other three arms constituting dummy resistances.

It should also be understood that the principles of the invention are applicable to other types of load cells such as a ring cell in which case the semiconductor material would constitute P type material rather than N type material.

The invention, accordingly, is not to be thought of as limited to the exact embodiments set forth merely for illustrative purposes.

What is claimed is:
1. In a load cell bridge circuit having first and second diagonally opposite input junction points and third and fourth diagonally opposite output junction points, the arms of said bridge connecting to said junction points including resistance means, at least one of said resistance means comprising strain gauge means secured to a load cell and responsive to a deforming force applied to said cell to change its resistance value and thereby provide an output signal at said output junction points, means for linearizing said output signal with respect to said force including: a T network comprised of first and second elements defining the arms of said T and a third element defining the leg of said T, said arms being connected across two diagonally opposite junction points of said bridge and the end of said leg being connected to a junction point between said two diagonally opposite junction points, at least one of said elements having a resistance proportional to strain and which is secured to said load cell to provide a resistance value in response to said force resulting in a modification of said output signal in a direction to render it substantially linear with respect to said force.

2. The subject matter of claim 1, in which said first and second elements are resistances and said third element constitutes said element having a resistance proportional to strain.

3. The subject matter of claim 1, in which said first and second elements each constitute an element having a resistance proportional to strain and said third element is a resistance.

4. In a load cell bridge circuit having first and second diagonally opposite input junction points and third and fourth diagonally opposite output junction points, the arms of said bridge connecting to said junction points including resistance means, at least one of said resistance means comprising strain gauge means secured to a load cell and responsive to a deforming force applied to said cell to change its resistance value and thereby provide an output signal at said output junction points, means for linearizing said output signal with respect to said force including: a T network comprised of first and second resistances defining the arms of said T and a semi-conductor defining the leg of said T, said arms being connected across two diagonally opposite junction points of said bridge and the end of said leg being connected to a junction point between said two diagonally opposite junction points, said semi-conductor being secured to said load cell to provide a resistance value in response to said force resulting in a modification of said output signal in a direction to render it substantially linear with respect to said force.

5. The subject matter of claim 4, including a variable trimming resistance shunting said semi-conductor.

6. In a load cell bridge circuit having first and second diagonally opposite input junction points and third and fourth diagonally opposite output junction points, the arms of said bridge connecting to said junction points including resistance means, at least one of said resistance means comprising strain gauge means secured to a load cell and responsive to a deforming force applied to said cell to change its resistance value and thereby provide an output signal at said output junction points, means for linearizing said output signal with respect to said force including: a T network comprising first and second semi-conductors defining the arms of said T and a resistance defining the leg of said T, said arms being connected across two diagonally opposite junction points of said bridge and the end of said leg being connected to a junction point between said two diagonally opposite junction points, said semi-conductors being secured to said load cell to provide a resistance value in response to said force resulting in a modification of said output signal in a direction to render it substantially linear with respect to said force.

References Cited

UNITED STATES PATENTS

| | | | |
|---|---|---|---|
| 2,980,852 | 4/1961 | Mell | 73—88.5 X |
| 2,034,346 | 5/1962 | Starr | 73—88.5 X |
| 3,230,763 | 1/1966 | Frantzis | 73—141 |
| 3,234,787 | 2/1966 | Ruge | 73—141 |
| 3,245,252 | 4/1966 | First et al. | 73—88.5 |

RICHARD C. QUEISSER, *Primary Examiner.*

CHARLES A. RUEHL, JAMES J. GILL, *Examiners.*